(12) United States Patent
Staples et al.

(10) Patent No.: US 9,725,133 B2
(45) Date of Patent: *Aug. 8, 2017

(54) BICYCLE CRANK ARM AND INSERT THEREFORE

(71) Applicant: Fox Factory, Inc., Scotts Valley, CA (US)

(72) Inventors: Jonathan Staples, Coquitlam (CA); Paul Sidlick, Campbell River (CA)

(73) Assignee: Fox Factory, Inc., Scotts Valley, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/341,300

(22) Filed: Jul. 25, 2014

(65) Prior Publication Data

US 2014/0345419 A1    Nov. 27, 2014

Related U.S. Application Data

(63) Continuation of application No. 13/675,304, filed on Nov. 13, 2012, now Pat. No. 8,820,192, which is a
(Continued)

(51) Int. Cl.
*B62M 3/00* (2006.01)
*B29C 70/74* (2006.01)
(Continued)

(52) U.S. Cl.
CPC ............. *B62M 3/00* (2013.01); *B29C 70/742* (2013.01); *B62K 19/16* (2013.01); *B29L 2031/3091* (2013.01); *Y10T 74/2164* (2015.01)

(58) Field of Classification Search
CPC ................... B29C 70/742; B29L 2031/3091
See application file for complete search history.

(56) References Cited

U.S. PATENT DOCUMENTS 4,446,753 A * 5/1984 Nagano .................... B62M 3/02
                                                        403/3
4,545,691 A   10/1985 Kastan et al.
(Continued)

FOREIGN PATENT DOCUMENTS

DE         3531030      3/1987
DE        19751879      5/1999
(Continued)

*Primary Examiner* — Vinh Luong

(57) ABSTRACT

A crank arm for a bicycle may include a body extending along a body axis and having a first body end and a second body end axially spaced apart from the first body end. The insert may also include an insert provided toward the first body end. The insert may include a base portion having a radially outer surface. At least one extension may extend outwardly from the radially outer surface and may be encased within a corresponding recess in the body whereby relative planar movement between the body and the at least one extension in a first plane. The retaining portion may have a retaining portion width measured in the first direction and the retaining width may be greater than the throat width thereby inhibiting relative radial movement between the at least one extension and the recess and preventing radial extraction of the extension from the corresponding recess.

20 Claims, 5 Drawing Sheets

Related U.S. Application Data continuation-in-part of application No. 12/432,681, filed on Apr. 29, 2009, now abandoned.

(51) Int. Cl.
*B62K 19/16* (2006.01)
*B29L 31/30* (2006.01)

(56) References Cited

U.S. PATENT DOCUMENTS

| | | | |
|---|---|---|---|
| 5,852,954 A | 12/1998 | Yamanaka | |
| 6,755,095 B2 | 6/2004 | Yamanaka | |
| 6,860,171 B1 | 3/2005 | Nanko et al. | |
| 7,610,832 B2 | 11/2009 | Dal Pra' | |
| 2003/0097900 A1 | 5/2003 | Yamanaka | |
| 2004/0200314 A1 | 10/2004 | Hermansen et al. | |
| 2005/0072264 A1 | 4/2005 | Yamanaka | |
| 2005/0081678 A1* | 4/2005 | Smith | B62M 3/003 74/594.1 |
| 2005/0199092 A1* | 9/2005 | Feltrin | B62K 19/16 74/594.1 |
| 2007/0186718 A1* | 8/2007 | Chiang | B29C 70/342 74/594.1 |
| 2007/0199403 A1 | 8/2007 | Ciavatta et al. | |
| 2007/0227294 A1 | 10/2007 | Valle | |
| 2009/0236777 A1* | 9/2009 | Chiang | B62M 3/00 264/523 |
| 2009/0243160 A1* | 10/2009 | Chiang | B29C 70/342 264/523 |
| 2010/0064845 A1* | 3/2010 | French | B62M 3/00 74/594.2 |
| 2013/0011215 A1* | 1/2013 | Wells | F16B 23/0007 411/402 |

FOREIGN PATENT DOCUMENTS

| | | |
|---|---|---|
| DE | 19954432 | 5/2001 |
| EP | 1270393 | 1/2003 |
| EP | 1352825 | 10/2003 |
| EP | 1426282 | 6/2004 |
| EP | 1493654 | 1/2005 |
| EP | 1884460 | 2/2008 |
| EP | 1884461 | 2/2008 |
| FR | 904975 | 11/1945 |
| FR | 946276 | 5/1949 |
| FR | 2501615 | 9/1982 |

* cited by examiner

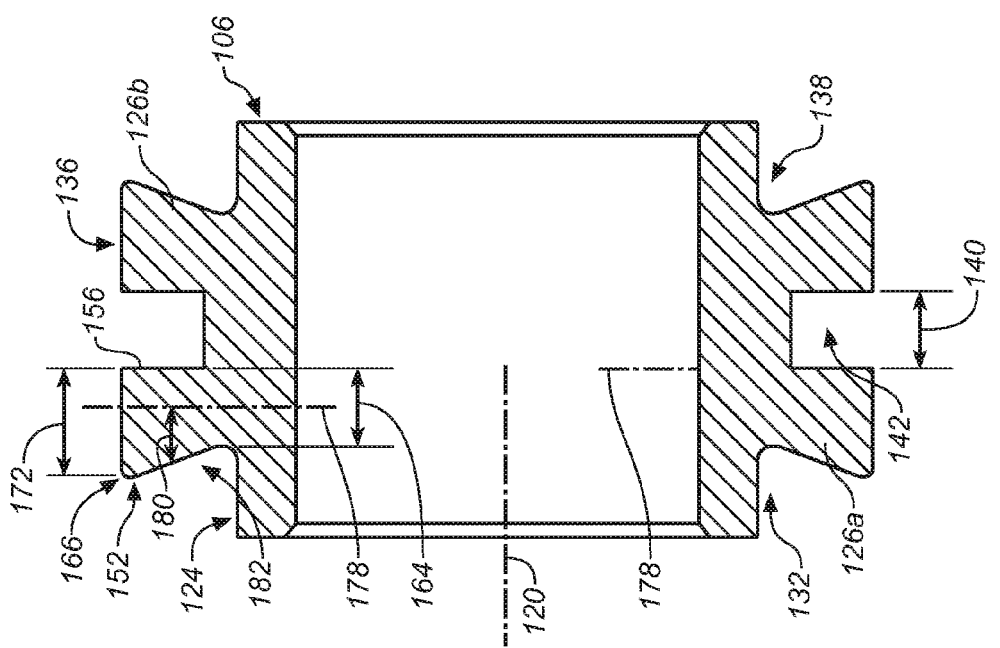
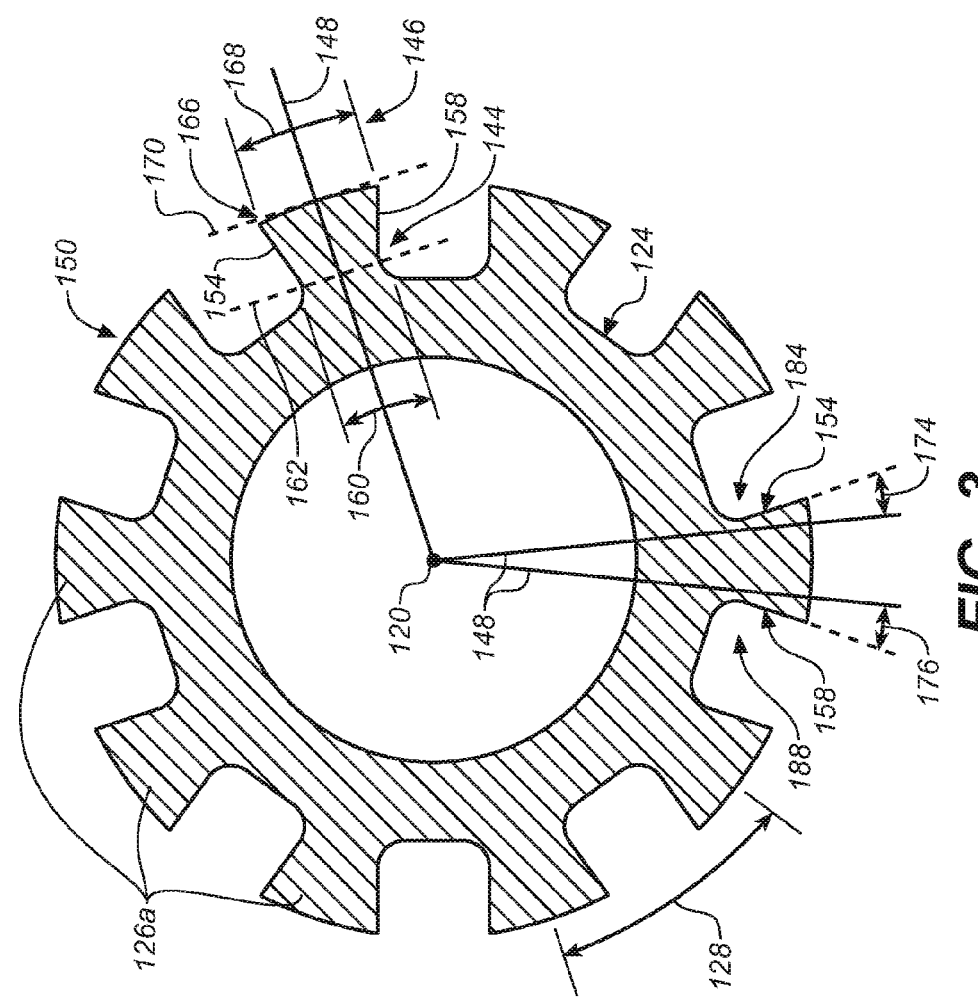

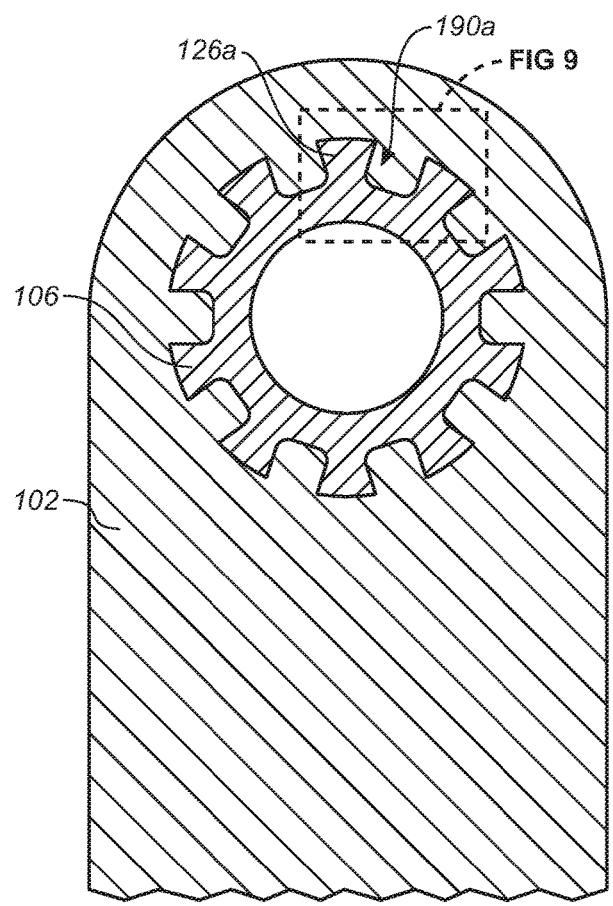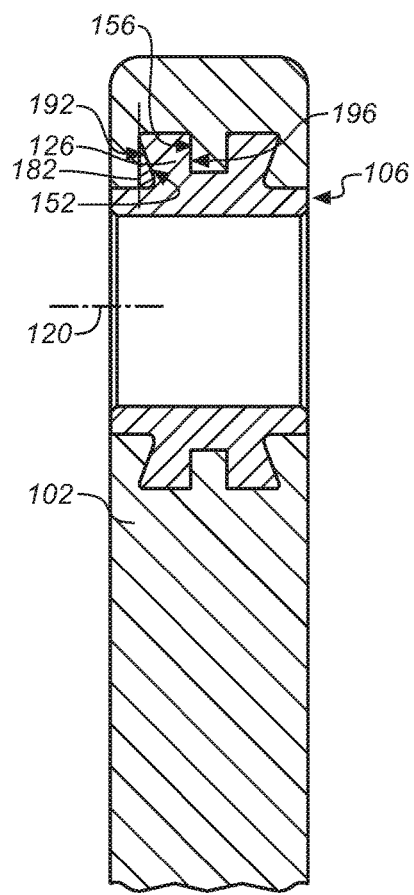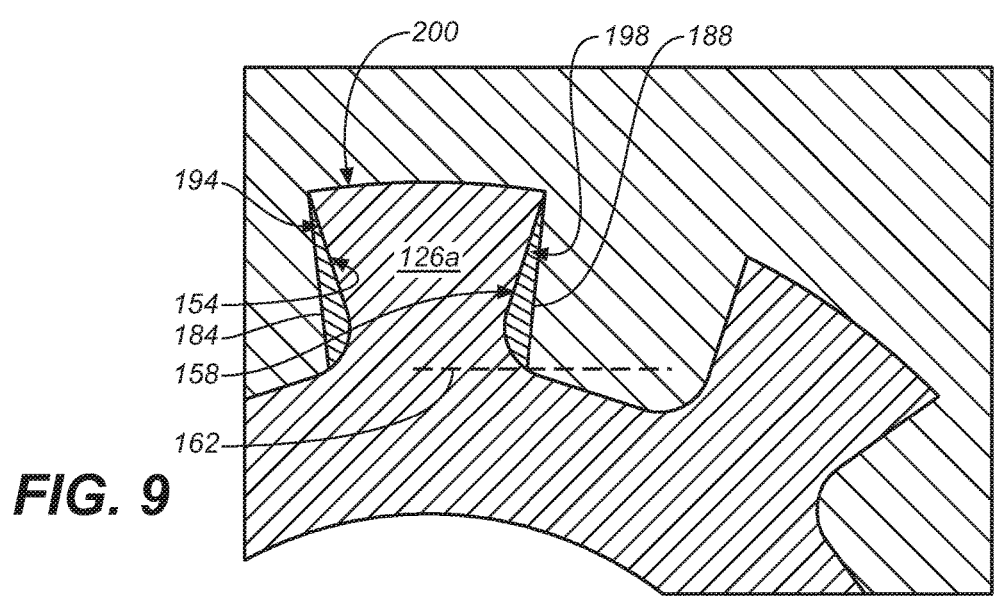

BICYCLE CRANK ARM AND INSERT THEREFORE

RELATED APPLICATIONS

This application is filed in accordance with 37 CFR 1.53(b) and is a continuation of co-pending U.S. patent application Ser. No. 13/675,304 filed Nov. 13, 2012, which itself is a continuation-in-part of U.S. patent application Ser. No. 12/432,681, filed Apr. 29, 2009, and both of these applications are hereby incorporated herein in their entirety by reference.

FIELD

The present invention relates to bicycle components such as crank arms and methods for making bicycle components.

BACKGROUND

US Patent Publication No. 2005/0199092 (Feltrin et al.) discloses an insert for a bicycle pedal crank that is made from unidirectional structural fibers incorporated in a polymeric material and coupled according to two distinct directions. The insert has a connection portion to connect to a part of the bicycle and a fastening portion to fasten the insert to the body of the crank arm.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

Known techniques for securing an insert within a body of a crank arm formed from a dissimilar material have generally failed to provide a satisfactory crank arm. In instances where the insert is formed from a material having a different co-efficient of thermal expansion, thermal shrinkage of the insert (for example when the crank arm is cooled to room temperature after being formed at a relatively high temperature) tends to loosen the connection between the insert and the body as the insert shrinks more than the body. This can lead to relative movement between the insert and the body when the crank arm is in use. Such relative movement may be undesirable as it may reduce pedaling efficiency, promote or accelerate wear of the body or insert and/or lead to the insert falling out or otherwise becoming separated from the body.

According to one broad embodiment of the teachings described herein, a crank arm for a bicycle may include a body extending along a body axis and having a first body end and a second body end axially spaced apart from the first body end. An insert may be provided toward the first body end. The insert may extend along an insert axis, define a radial direction orthogonal to the insert axis and include a base portion. The base portion may have a radially outer surface surrounding an axially extending aperture extending through the base portion. The aperture may be configured to receive a fastener for connecting the crank arm to another component of the bicycle. At least one extension may extend outwardly from the radially outer surface. The at least one extension may be encased within a corresponding recess in the body, whereby relative planar movement between the body and the at least one extension in a first plane orthogonal to the radial direction is restrained. The at least one extension may include a neck adjacent the radially outer surface and a retaining portion spaced radially outward from the neck. The neck may extend through a throat region of the corresponding recess and having a neck width measured in a first direction parallel to the first plane. The throat region may have a throat width measured in the first direction. The retaining portion may have a retaining width measured in the first direction and the retaining width may be greater than the throat width thereby inhibiting relative radial movement between the at least one extension and the recess and preventing radial extraction of the at least one extension from the corresponding recess.

The body may be formed from a body material having a first coefficient of thermal expansion and the insert is formed from an insert material having a second coefficient of thermal expansion. The second coefficient of thermal expansion may be greater than the first coefficient of thermal expansion. Shrinkage of the insert relative to the body cannot radially extract the at least one extension from the cavity.

The extension may also include opposing first and second extension sidewalls spaced apart from each other in the first direction. Each extension sidewall may extend between the neck and the retaining portion. The first sidewall may be generally planar and may be inclined at a first angle relative to the radial direction so that the extension generally narrows from the retaining portion to the neck end thereby wedging the extension within the recess to inhibit relative radial movement therebetween.

The recess may include a generally planar first recess wall inclined at the first angle relative to the radial direction. The first extension sidewall opposing and bearing against the first recess wall whereby shrinkage of the insert relative to the body increases the magnitude of a first engagement force exerted between the first extension sidewall and the first recess wall thereby wedging the at least one extension more tightly within the recess in the first direction.

The second extension sidewall may be generally planar and may be inclined at a second angle relative to the radial direction, the first and second extension sidewall being convergent toward the neck of the extension.

The first angle may be generally equal in magnitude to the second angle.

The recess may include a generally planar second recess wall inclined at the second angle relative to the radial direction. The second extension sidewall opposing and bearing against the second recess wall whereby shrinkage of the insert relative to the body increases the magnitude of a second engagement force exerted between the second extension sidewall and the second recess wall.

The neck has a neck depth measured in a second direction parallel to the insert axis. The retaining portion may have a retaining depth measured in the second direction and the throat may have a throat depth measured in the second direction. The throat depth may be equal to or greater than the neck depth and may be less than the retaining depth.

The extension may also include a third extension sidewall wall generally bounded by the first extension sidewall, the second extension sidewall, the retaining portion and the neck. The third extension sidewall may be generally planar and inclined at a third angle relative to the radial direction so that the extension is generally tapered in the second direction between the retaining portion and the neck.

The recess may include a generally planar third recess wall inclined at the third angle relative to the radial direction. The third extension sidewall opposing and bearing against the third recess wall whereby shrinkage of the insert relative to the body increases the magnitude of a third engagement force exerted between the third extension sidewall and the third recess wall thereby wedging the at least one extension more tightly within the recess in the second direction.

The extension may also include a fourth extension sidewall spaced apart from the third extension sidewall in the second direction and generally bounded by the first and second extension sidewalls, the retaining portion and the neck, the fourth extension sidewall and the third extension sidewall being generally convergent toward the neck of the extension.

The fourth sidewall may be generally planar and extends in the radial direction.

The at least one extension may include a first plurality of extensions circumferentially spaced apart from each other around a circumference of the radially outer surface of the insert.

A second plurality of extensions may be circumferentially spaced apart from each other around the circumference of the radially outer surface of the insert and axially spaced apart from the first plurality of extensions along the insert axis.

Each extension in the second plurality of extensions may be generally opposite a corresponding one of the extensions in the first plurality of extensions and may be spaced apart from the corresponding one of the extensions in the first plurality of extensions in the second direction.

The fourth extension side wall of each extension in the first plurality of extension may be opposite the fourth extension side wall of one corresponding extension in the second plurality of extensions.

The retaining portion may form the radially outermost portion of the extension.

A second insert may be provided toward the second body end. The second insert may extend along a second insert axis and may define a second radial direction orthogonal to the second insert axis. The second insert may include a second base portion having a second radially outer surface and at least one second extension extending outwardly from the second radially outer surface. The at least one second extension may be encased within a corresponding second recess in the body, whereby relative planar movement between the body and the at least one second extension in a second plane orthogonal to the second radial direction is restrained.

The at least one second extension may include a second neck adjacent the second radially outer surface and a second retaining portion spaced radially outward from the second neck. The second neck may extend through a second throat region of the corresponding second recess and may have a second neck width measured in a fifth direction parallel to the second plane. The retaining portion may have a second retaining width measured in the fifth direction and the second retaining width being greater than the second neck width thereby preventing radial extraction of the at least one second extension from the corresponding second recess.

According to another broad aspect of the teachings described herein, a crank arm for a bicycle may include a body having comprising a first end and a second end axially spaced apart from the first end along a body axis. An insert may be positioned within the body toward the first end. The insert may extend along an insert axis, define a radial direction orthogonal to the insert axis and have a radially outer surface. The insert may comprise a base portion having a radially outer surface and a plurality of extensions extending outwardly from the radially outer surface. Each extension may be encased within a corresponding recess in the body, whereby relative planar movement between the body and each extension in a first plane orthogonal to the radial direction is restrained. Each extension may comprise a neck adjacent the radially outer surface and a retaining portion spaced radially outward from the neck. Each neck may extend through a throat region of one corresponding recess and may have a neck cross-sectional area measured in a second plane orthogonal to the radial direction. The throat may have a throat cross-sectional area measured in the second plane and the retaining portion may have a retaining cross-sectional area measured in third plane parallel to the second plane. The retaining cross-sectional area may be greater than the neck portion cross-sectional area and the throat cross-sectional area thereby preventing radial extraction of each extension from the one corresponding recess.

The body may be formed from a body material having a first coefficient of thermal expansion and the insert is formed from an insert material having a second coefficient of thermal expansion, the second coefficient of thermal expansion being different than the first coefficient of thermal expansion and shrinkage of the insert relative to the body increases the magnitude of a retention force exerted between the body and the retaining portion of each insert.

A method of forming a crank arm during the moulding process is provided, including the steps of: a) providing an insert made of a material, the insert defining an aperture, the insert having a plurality of extensions, each of the extensions fitting within a corresponding recess, wherein the neck of the insertions is narrower than a distance between a first side of the insertion and a second side of the insertion; b) heating the crank arm whereby composite material cures around the extensions, thereby defining a crank arm having a body made of the composite material, the body defining a plurality of recesses, each of the recesses having an opening, and at least one of the recesses having a width from a first side of the recess to a second side of the recess exceeding the length of the opening; c) cooling the crank arm, whereby the material shrinks relative to the composite material during cooling of the crank arm.

DRAWINGS

The following figures set forth embodiments of the invention in which like reference numerals denote like parts. Embodiments of the invention are illustrated by way of example and not by way of limitation in the accompanying figures.

FIG. 3 is a cross-sectional view of the insert of FIG. 2, taken along line 3-3;

FIG. 4 is a cross-sectional view of the insert of FIG. 2, taken along line 4-4;

FIG. 8 is the cross-sectional view of FIG. 5 before shrinkage of the insert;

FIG. 9 is an enlarged view of a portion of the cross-sectional view of FIG. 8;

FIG. 10 is the cross-sectional view of FIG. 7 before shrinkage of the insert.

DETAILED DESCRIPTION

Figure 1:
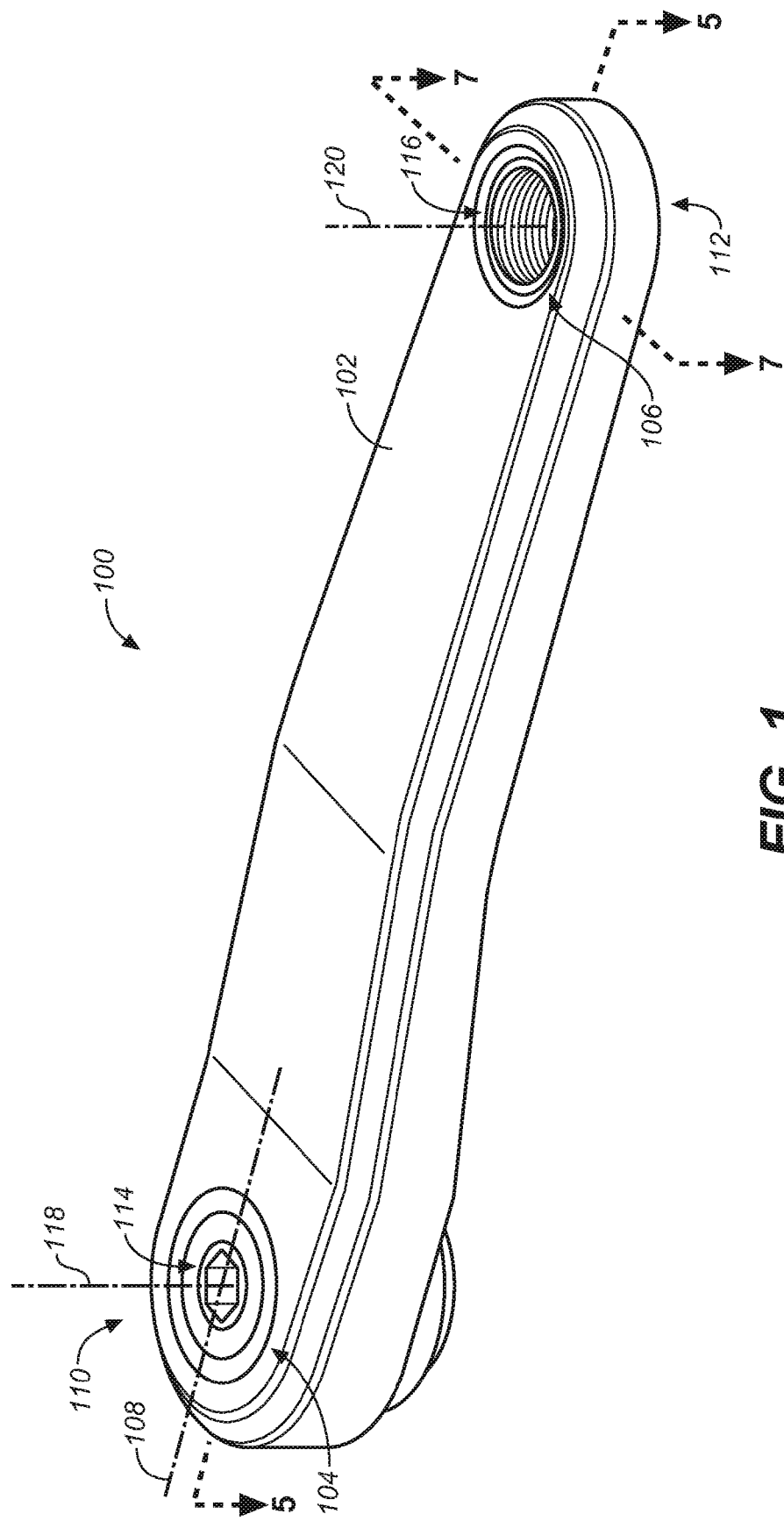
FIG. 1 is a perspective view of a crank arm.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Bicycle crank arms typically form part of the crankset or chainset of a bicycle. The crank arms generally extend between the bottom bracket on the bicycle frame and the pedals. A conventional pedal bicycle has two crank arms, typically mounted 180 degrees out of phase from each other. Crank arms can be made from any suitable material having the required strength to transfer pedaling force from the user's legs to the crankset. For example, known crank arms have been made from metals, such as steel and aluminium, and composite materials, such as carbon fibre and other materials.

The apparatus and system according to the invention uses a series of widening recesses within a crank arm to mechanically lock an insert to the carbon fibre during the cooling that takes place after the moulding process. As the insert shrinks it follows the recess wall of the hollow made by the insert rather than shrinking away from it. The insert angle can be chosen to be equal to, greater than or less than the angle of shrinkage at any particular location of the insert. Changing the angle changes the gap (or interference) produced during the shrinkage thereby changing the locking characteristics and allowing the crank arm to be optimized for a given loading.

Crank arms can be connected to the bottom bracket and/or pedals using spindles, bolts, pins or other suitable rotatable connection mechanism. Some composite materials used to form crank arms are not well suited to connect to or support a rotatable connection mechanism. For example, crank arms formed from carbon fibre may be relatively strong and lightweight, but the carbon fibre material may not have sufficient mechanical properties to withstand the loading and stress concentrations exerted by the rotatable connection mechanism.

One technique to help address this problem is to manufacture a crank arm having a body that is formed from a composite material and to provide one or more inserts at the ends of the crank arm where it is connected to the pedal or bottom bracket. Such inserts may be formed from a different material than the body of the crank arm. For example, the insert material may be selected to have sufficient strength and other material properties to support the rotatable connection mechanism, including, for example, aluminum, titanium, steel, magnesium, stainless steel, or various plastics such as polyurethane, polypropylene, or polycarbonate. Using the combination of a composite body and metal insert may allow the crank arm to generally benefit from the desirable properties of the composite material (e.g. strength, low weight, etc.) while still having sufficient connection strength.

In crank arms of this configuration, the quality of the connection between the insert and the body of the crank arm can affect the quality and/or durability of the assembled crank arm. Typically, the insert material will have a larger co-efficient of thermal expansion than the composite body material, which can result in shrinkage of the insert relative to the body, for example when the crank arm is cooled after the composite material molding process. Such shrinkage can lead to a loosening of the insert within the body. Loosening of the insert can lead to rattling, unwanted rotation of the insert relative to the body, fatigue of the body portion and ultimately failure of the crank arm. The teachings herein describe an example of a connection between an insert and crank arm body that may help mitigate and/or eliminate loosening of the insert caused by differential thermal expansion.

Referring to FIG. 1, one example of a crank arm 100 includes a body 102 a first insert 104 and a second insert 106. Optionally, while currently illustrated with two inserts 104, 106, a crank arm 100 may be configured to include a different number of inserts, including, for example, only one insert.

In the illustrated example, the body 102 is generally elongate and extends along a body axis 108 between a first end 110, for connecting to bottom bracket of a bicycle, and a second end 112, for connecting to a pedal assembly.

The body 102 is formed from a body material, and the inserts 104 and 106 are formed from an insert material, which can be different than the body material. In the illustrated example, the body 102 is formed from carbon fiber and the inserts 104, 106 are formed from aluminium. Alternatively, the body 102 may be formed from any other suitable material, including, for example, composite materials such as fiberglass, Kevlar®, boron fiber or beryllium fiber, or metal or plastic. The inserts 104, 106 may be formed from any suitable material that has the desired strength to support the rotatable connection between the crank arm and other bicycle components including, for example, steel, titanium, other metals and/or plastics.

The inserts 104, 106 are configured to be mounted within the body 102, and to facilitate connection with the bottom bracket and pedal assembly, respectively. Each insert 104, 106 includes a central bore or aperture 114 and 116 that is configured to accommodate a fastener. The bores 114 and 116 may be threaded or otherwise configured to mate with a corresponding fastener. In the illustrated example, both inserts 104 and 106 extend along respective insert axes 118 and 120. The inserts 104, 106 in the crank arm 100 can be identical, or may be different from each other. Providing differently configured inserts may help facilitate different types of connections between the crank arm 100 and the bottom bracket and pedal assembly. For simplicity, insert 106 will be described in greater detail herein, but it is understood that insert 104 can include identical and/or analogous features.

Figure 2:
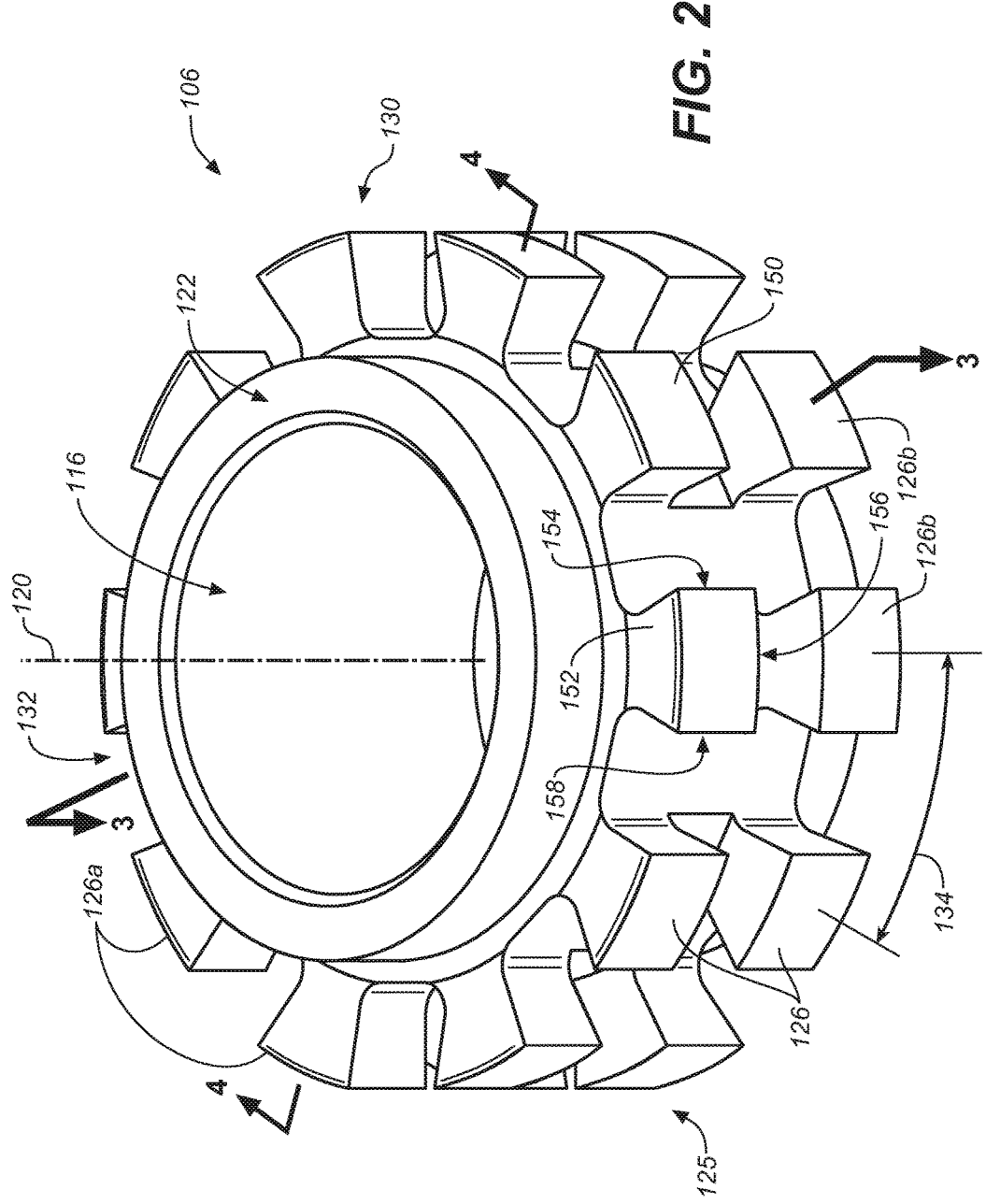
FIG. 2 is a perspective view of an example of an insert for the crank arm of FIG. 1.

Referring to FIG. 2, insert 106 includes a generally cylindrical body portion 112 surrounding the bore 116 and having a radially outer surface 124 (see FIG. 3). To help secure the insert 106 within the body 102, the insert 106 can include one or more anchor members 125 that are configured to be embedded in and encased by the body 102. The anchor members 125 can be configured to help inhibit rotation of the insert 106 relative to the body 102 about the insert axis 120, and/or to help inhibit translation of the insert 106 relative to the body 102 along the insert axis 120.

In the illustrated example, the anchor members 125 include a plurality of extensions 126 extending generally outwardly from the radially outer surface 124 (see FIG. 3) of the insert 106. The extensions 126 include a first set of extensions 126a that are circumferentially spaced apart from each other about the periphery or circumference of the insert 106 by a first spacing distance 128 (illustrated as a centre-to-centre distance), and are arranged to provide a first ring of extensions 130 (see FIG. 5). The first ring of extensions 130 is axially positioned toward a first end 132 of the insert 106.

The extensions 126 also include a second set of extensions 126b that are circumferentially spaced apart from each other about the periphery of the insert 106 by a second spacing distance 134, and are arranged to provide a second ring of extensions 136 (see FIG. 4). Referring to FIG. 4, the second ring of extensions 136 is axially positioned toward a second end 138 of the insert 106 and is axially spaced apart from the first ring of extensions by a ring spacing distance 140.

In the illustrated example, each extension 126a in the first ring 130 is circumferentially aligned with an opposing extension 126b in the second ring 136. In this configuration, axial gaps 142 are provided between opposing extensions 126a and 126b. Arranging the extensions 126a and 126b in this pattern may help simplify the manufacturing of the insert 106. Alternatively, the extensions 126a and 126b may be configured so that extensions 126a in the first ring 130 are circumferentially offset from extensions 126b in the second ring 136. While illustrated with 10 extensions in each of the first and second rings, the insert may be provided with any suitable number of extensions, including, for example, between about 1 and about 40 extensions or more, and preferably between about 4 and about 30 extensions.

Referring to FIG. 3, each extension 126a extends outwardly from a neck portion 144 adjacent the radially outer surface 124 of the insert 106 and distal end or tip 146 that is radially outboard from the neck portion 144 in the radial direction 148. The tip 146 includes a radially outwardly facing end face 150. In the illustrated example, each extension includes four, generally planar sidewalls 152, 154, 156 and 158 (FIG. 4) that extend between the neck 144 and the tip 146. Alternatively, the extensions 126 may be of any other suitable shape, including, for example, spherical, conical, pyramidal and other shapes that can be configured to function as described herein.

Referring to FIG. 3, the neck portion 144 defines a neck width 160, measured in a plane 162 that is orthogonal to the radial direction 148, and, referring to FIG. 4, a neck depth 164, measured in the axial direction. The neck width 160 and neck depth 164 can be any suitable size based on the overall size of the crank arm 100 and the expected loading conditions, and can each be, for example, between about 2 mm and about 15 mm or more, and/or between about 3 mm and about 10 mm. The neck portion 144 also defines a radial cross-sectional area measure in plane 162.

Each extension 126a also includes a retaining portion 166 that is configured to help lock the extensions 126a within respective cavities formed in the carbon fibre body 102 and to help inhibit movement of the insert 106 relative to the body 102, as explained in more detail below. The retaining portion 166 is a portion of the extension 126a that is generally wider and/or deeper than the neck portion 144. The retaining portion 166 defines a retaining portion width 168, measured in a plane 170 that is orthogonal to the radial direction 148 and is parallel to and radially outboard from the plane 162.

The retaining portion width 168 is selected to be larger than the neck portion width 160, and can be between about 3 mm to about 20 mm or more. The retaining portion 166 also defines a retaining portion depth 172 (FIG. 3) measured in the insert axial direction. The retaining portion depth 172 is selected to be larger than the neck portion depth 164, and can be between about 3 mm to about 20 mm or more. The retaining portion 166 also defines a retaining portion radial cross-sectional area, measured in plane 170, that is greater than the neck portion cross-sectional area. In this configuration, each extension 126a generally tapers from its retaining portion 166 to its neck portion 144.

In the illustrated example, the retaining portion 166 is provided at the tip 146 of the extension 126a (i.e. is the radially outermost portion of the extension 126a), such that the extension 126a generally narrows or tapers from the tip 146 to the neck portion 144. Alternatively, the extension 126a may be configured such that the retaining portion 166 (e.g. the portion with the largest radial cross-sectional area) is positioned radially intermediate the neck portion 144 and the tip 146 (for example if the extension were spherical).

Referring to FIG. 3, sidewalls 154 and 158 generally oppose each other in the circumferential direction and are each inclined relative to the radial direction by a respective incline angle 174 and 176. The sidewalls 154, 158 are inclined in such a manner that the extension 126a narrows in the circumferential direction from the retaining portion 166 to the neck portion 144 and so that they generally converge toward the insert axis 120. The incline angles 174 and 176 can be any suitable angle, including, for example between about 2 degrees and about 30 degrees or more, and is preferably between about 7 degrees and about 15 degrees. While illustrated as being generally equal, incline angles 174 and 176 may be the same or different.

Referring to FIG. 4, sidewalls 152 and 156 generally opposed each other in the insert axial direction. In the illustrated example sidewall 156 is parallel to a plane 178 that is orthogonal to the insert axis 120 whereas sidewall 152 is inclined at an angle 180 relative to the plane 178. The angle 180 can be any suitable angle, and can be between about 2 degrees and about 30 degrees or more, and is preferably between about 7 degrees and about 15 degrees In this configuration, the extension 126a generally tapers from the retaining portion 166 to the neck portion 144 in the insert axial direction, and the sidewalls 152 and 156 generally converge toward the plane 178. While illustrated with only one of sidewalls 152 and 156 inclined, alternatively the extension 126a can be configured so that both sidewalls 152 and 156 are inclined relative to plane 178, and converge toward the plane 178.

In the illustrated example, inclined sidewalls 152, 154 and 158 each overhang or overlie a portion of the radially outer surface 124 and define a respective cavity 182, 184 and 188 that can be filled with body material (e.g. carbon fibre material and epoxy resin) during the crank arm manufacturing process (explained in more detail below). This may help anchor the extensions 126a within the body 102. In contrast, in the illustrated example, non-inclined sidewall 156 does not overhang the radially outer surface 124 of the insert base portion 122 and does not define a corresponding cavity.

While illustrated with two rings 130 and 136 of ten extensions 126 each, alternatively, the insert 126a may include a different number of and/or configuration of extensions 126, and need not include two axially spaced apart rings 130 and 136 of extensions. The extensions 126 may be provided in any suitable pattern or configuration, and may include only a single set of extensions 126 and/or be configured so that each extension extends substantially the entire axial length of the insert.

Referring to FIG. 8, in the illustrated example, the crank arm is formed by a molding process in which both the body 102 and insert 106 are contained within a heated mold and held at elevated temperatures (for example temperatures greater than 100 degrees Celsius). FIG. 8 is a cross-sectional view of a portion of the crank arm 100 while it is at the elevated, molding temperature. Referring to FIG. 9, during this molding process the carbon fibre body material is molded around the extensions 126a thereby covering sidewalls 154 and 158 and is forced into the cavities 184 and 188 (illustrated as hatched areas in this FIG. 9). Encasing the extensions 126a in this manner may inhibit relative rotation of the insert 106 relative to the body 102.

Referring to FIG. 10, during the molding process the carbon fibre body material also encases sidewalls 152 and 156 and is forced into the cavity 182 (illustrated as hatched areas in FIG. 10). In the illustrated example, the extensions 126a are completed encased within the body material such that all of the sidewalls 152, 154, 156 and 158 are covered by body material. Encasing the extensions 126 in this manner may inhibit movement of the extensions 126a, and therefore the insert 106, relative to the body 102 in insert axial direction.

After the molding process is complete, the molded crank arm is then removed from mold and cooled to room temperature. During the cooling phase the body 102 and the inserts 104 and 106 may shrink as a result of thermal contraction.

Figure 5:
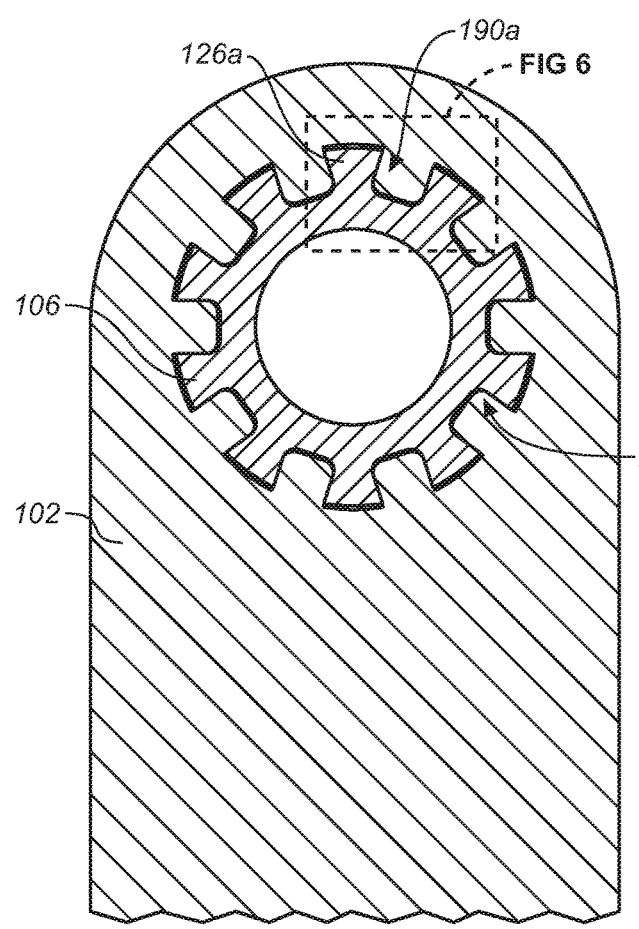
FIG. 5 is cross-sectional view of a portion of the crank arm of FIG. 1, taken along line 5-5.
Figure 7:
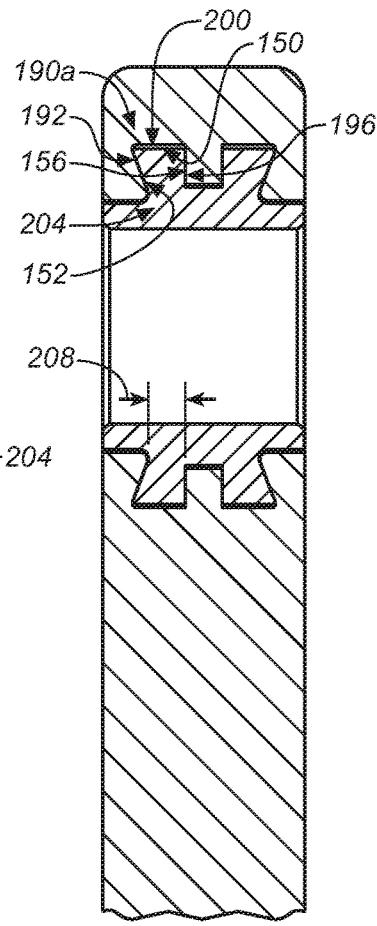
FIG. 7 is a cross-sectional view of a portion of the crank arm of FIG. 1, taken along line 7-7.
Figure 6:
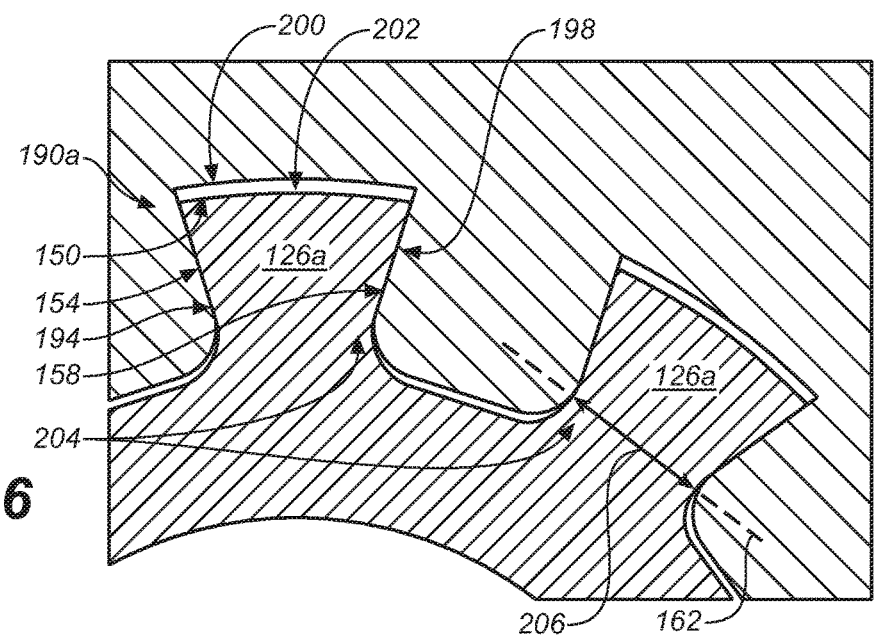
FIG. 6 is an enlarged view of a portion of the cross-sectional view of FIG. 5.

FIGS. 5-7 illustrate the insert 106 and body 102 after the crank arm 100 has cooled to room temperature. Referring to FIG. 5, in the current example, when the insert 106 is molded within the body 102 each extension 126 is embedded within the body material and becomes encased in a corresponding recess 190 formed in the body 102. The recesses 190 are created as the body material is forced around the extensions 126 during molding, and the shape of each recesses 190 generally matches the shape of its contained extension 126.

In the illustrated example, each recess includes four recess sidewalls corresponding to opposing extension sidewalls. Referring to FIG. 6, recess 190a includes sidewalls 194 and 198 opposing extension sidewalls 154 and 158 respectively. Referring to FIG. 7, recess 190a also includes sidewalls 192 and 196, opposing extension sidewalls 152 and 156 respectively.

The recess 190a also includes a recess end wall 200 overlying the extension end face 150, and defines an opening or throat region 204 through which the neck portion 144 extends. The throat region 204 surrounds the neck portion 144 and defines a throat width 206 measure in the same plane 162 as the neck width 160 (FIG. 6) and a throat depth 208 measured in the same direction as the neck depth 164 (FIG. 7). The throat width 206 is equal to or slightly greater than the neck width 160, and the throat width 206 is less than the retaining portion width 168. Similarly, in the illustrated example, the throat depth 208 is equal to or slightly greater than the neck depth 164 and is less than the retaining portion depth 172. In this configuration, the radial cross-sectional area of the throat (measured in plane 162) is equal to or greater than the cross-sectional area of the neck portion 144 and is less than the cross-sectional area of the retaining portion 166.

Referring to FIGS. 9 and 10, when the insert 106 and body 102 are both at elevated temperatures during the molding process, each recess wall 192, 194, 196 and 198 is in contact with its opposing extension sidewall 152, 154, 156 and 158, and endwall 200 is in contact with end face 150.

As aluminium has a greater co-efficient of thermal expansion than carbon fiber, when the molded crank arm cools, the inserts 104 and 106 will tend to thermally contract or shrink more than the carbon fibre body 102. When the extension 126a cools it may tend to shrink radially.

Referring to FIGS. 6 and 7, in the illustrated example, the extension 126a shrinks by such an amount that the extension end face 150 becomes axially spaced apart from the recess endwall 200 and a gap 202 is created. Absent a countering force, the presence of such a gap 202 may permit the extension to move radially relative to the body resulting in loosening of the insert. However, in the illustrated example, corresponding shrinkage of the other extensions 126a around the perimeter of the insert 106 create balancing forces that co-operate to inhibit movement of the insert 106 in the radial direction 148 relative to the body 102.

Referring to FIG. 6, as the insert 106 shrinks the inclined or wedge-like configuration of extension sidewalls 154 and 158, and corresponding recess sidewalls 194 and 198, allows the extension sidewalls 154 and 158 to slide along the recess sidewalls 194 and 198. In this configuration, as the insert 106 shrinks the sidewalls 154 and 158 do not lose contact with their respective recess sidewalls 194 and 198. Instead, due to its tapered nature, the extension 126a may actually become more tightly seated within its cavity 190a and the sidewalls 154 and 158 will be more tightly wedged against the recess sidewalls 194 and 198. This may allow the magnitude of the force acting between the extension sidewalls 154 and 158 and recess sidewalls 194 and 198 to remain constant or increase as the insert 106 shrinks. Increasing the force acting on the extension 126a in the circumferential direction may help hold the insert 106 firmly in place and may help inhibit relative rotation of the insert 106 (about the insert axis 120) relative to the body 102. While illustrated as a two-side wedge configuration (both sidewalls 154 and 158 are inclined) to help provide a balanced circumferential wedging force, a similar wedging effect in the circumferential direction may be achieved if only one of sidewalls 154 and 158 is inclined.

Similarly, the wedge-like configuration of extension sidewall 152 and corresponding recess sidewall 192 can provide a wedging or tightening effect in the insert axial direction as the insert shrinks 106. Providing such a wedge-like configuration in the axial direction may help firmly hold the insert 106 in place axially, and may help prevent translation of the insert 106 (along the insert axis 120) relative to the body 102. In the illustrated example, the axial wedging features of extensions 126a in the first ring 130 are balanced by opposite axial wedging features of extensions 126b in the second ring 136.

Due to the inclined configuration of sidewalls 152, 154 and 158 and the generally wedge-like nature of the extensions 126 the magnitude of the engagement forces holding the extensions 126 in place after they have cooled can exceed the magnitude of the surface friction between the extension sidewalls 152, 154 and 158 recess sidewalls 192, 194 and 198.

Increasing the reaction or engagement forces acting on the extension sidewalls 152, 154 and 158 may increase the stress exerted on the neck portion 144 of the extension 126. Varying the inclination angle of the sidewalls 152, 154 and 158, the cross-sectional area of the neck portion 144, the material of the insert 106 or any combination thereof may allow the insert 106 to be configured to resist the elevated stress caused by the expected thermal shrinkage.

The wedge-like configuration of the extensions 126 may also increase engagement force between and extension 126 and its surrounding cavity 190 may also increase when the insert is under load, for example when the crank arm is in use.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A crank arm for a bicycle, the crank arm comprising:
    a body extending along a body axis and having a first body end and a second body end axially spaced apart from the first body end;
        an insert provided toward the first body end, the insert extending along an insert axis, defining a radial direction orthogonal to the insert axis and comprising a base portion, the base portion having a radially outer surface surrounding an axially extending aperture extending through the base portion, the aperture configured to receive a fastener for connecting the crank arm to another component of the bicycle;
    at least one extension disposed in a first ring of said extensions, said extension extending outwardly from the radially outer surface, the at least one extension encased within a corresponding recess in the body, said at least one extension encased within said corresponding recess in said body restraining relative movement between the body and the at least one extension about a direction along said insert axis, the at least one extension comprising a neck adjacent the radially outer surface and a retaining portion spaced radially outward from the neck, the neck extending through a throat region of the corresponding recess and having a neck width measured in a first direction, the throat region having a throat width measured in the first direction, the retaining portion having a retaining width measured in the first direction and the retaining width being greater than the throat width such that relative radial movement between the at least one extension and the recess is inhibited and radial extraction of the at least one extension from the corresponding recess is prevented; and
    a second ring comprised of at least one extension, said second ring disposed proximate said first ring of said extensions.

2. The crank arm of claim 1, wherein the body is formed from a body material having a first coefficient of thermal expansion and the insert is formed from an insert material having a second coefficient of thermal expansion, the second coefficient of thermal expansion being greater than the first coefficient of thermal expansion, and wherein shrinkage of the insert relative to the body cannot radially extract the at least one extension from the cavity.

3. The crank arm of claim 2, wherein the extension further comprises opposing first and second extension sidewalls spaced apart from each other in the first direction, each extension sidewall extending between the neck and the retaining portion, the first sidewall being planar and being inclined at a first angle relative to the radial direction so that the extension narrows from the retaining portion to the neck end to wedge the extension within the recess to inhibit relative radial movement therebetween.

4. The crank arm of claim 3, wherein the recess comprises a planar first recess wall inclined at the first angle relative to the radial direction, the first extension sidewall opposing and bearing against the first recess wall whereby shrinkage of the insert relative to the body increases the magnitude of a first engagement force exerted between the first extension sidewall and the first recess wall to wedge the at least one extension more tightly within the recess in the first direction.

5. The crank arm of claim 4, wherein the second extension sidewall is planar and is inclined at a second angle relative to the radial direction, the first and second extension sidewall being convergent toward the neck of the extension.

6. The crank arm of claim 5, wherein the first angle is equal in magnitude to the second angle.

7. The crank arm of claim 6, wherein the recess comprises a planar second recess wall inclined at the second angle relative to the radial direction, the second extension sidewall opposing and bearing against the second recess wall and wherein shrinkage of the insert relative to the body increases the magnitude of a second engagement force exerted between the second extension sidewall and the second recess wall.

8. The crank arm of claim 1, wherein the neck has a neck depth measured in a direction parallel to the insert axis, the retaining portion has a retaining depth measured in the direction parallel to the insert axis and the throat has an throat depth measured in the direction parallel to the insert axis, the throat depth being equal to or greater than the neck depth and being less than the retaining depth.

9. The crank arm of claim 8, wherein the extension further comprises a third extension sidewall wall bounded by a first extension sidewall, a second extension sidewall, the retaining portion and the neck, the third extension sidewall being planar and inclined at a third angle relative to the radial direction so that the extension is tapered in the second direction between the retaining portion and the neck.

10. The crank arm of claim 9, wherein the recess comprises a planar third recess wall inclined at the third angle relative to the radial direction, the third extension sidewall opposing and bearing against the third recess wall whereby shrinkage of the insert relative to the body increases the magnitude of a third engagement force exerted between the third extension sidewall and the third recess wall thereby wedging the at least one extension more tightly within the recess in the second direction.

11. The crank arm of claim 10, wherein the extension further comprises a fourth extension sidewall spaced apart from the third extension sidewall and bounded by the first and second extension sidewalls, the retaining portion and the neck, the fourth extension sidewall and the third extension sidewall being convergent toward the neck of the extension.

12. The crank arm of claim 11, wherein the fourth sidewall is planar and extends in the radial direction.

13. The crank arm of claim 1, wherein the at least one extension comprises a first plurality of extensions circumferentially spaced apart from each other around a circumference of the radially outer surface of the insert.

14. The crank arm of claim 13, further comprising a second plurality of extensions circumferentially spaced apart from each other around the circumference of the radially outer surface of the insert and axially spaced apart from the first plurality of extensions along the insert axis.

15. The crank arm of claim 14, wherein each extension in the second plurality of extensions is opposite of a corresponding one of the extensions in the first plurality of extensions and is spaced apart from the corresponding one of the extensions in the first plurality of extensions.

16. The crank arm of claim 15, wherein the fourth extension side wall of each extension in the first plurality of extension is opposite the fourth extension side wall of one corresponding extension in the second plurality of extensions.

17. The crank arm of claim 1, wherein the retention portion forms the radially outermost portion of the extension.

18. The crank arm of claim 17, wherein the body is formed from a body material having a first coefficient of thermal expansion and the insert is formed from an insert material having a second coefficient of thermal expansion, the second coefficient of thermal expansion being different than the first coefficient of thermal expansion and shrinkage of the insert relative to the body increases the magnitude of a retention force exerted between the body and the retaining portion of each insert.

19. The crank arm of claim 1, further comprising:
a second insert provided toward the second body end, the second insert extending along a second insert axis and defining a second radial direction orthogonal to the second insert axis, the second insert comprising a second base portion having a second radially outer surface and at least one second extension extending outwardly from the second radially outer surface, the at least one second extension encased within a corresponding second recess in the body, whereby relative planar movement between the body and the at least one second extension is restrained;
the at least one second extension comprising a second neck adjacent the second radially outer surface and a second retaining portion spaced radially outward from the second neck, the second neck extending through a second throat region of the corresponding second recess, the second throat region having a second throat width, the retaining portion having a second retaining width, the second retaining width being greater than the second throat width to prevent radial extraction of the at least one second extension from the corresponding second recess.

20. A crank arm for a bicycle, the crank arm comprising:
a body having comprising a first end and a second end axially spaced apart from the first end along a body axis;
an insert positioned within the body toward the first end, the insert extending along an insert axis, defining a radial direction orthogonal to the insert axis the insert comprising a base portion having a radially outer surface and a plurality of extensions extending outwardly from the radially outer surface, said plurality of extensions disposed in a first ring, each extension encased within a corresponding recess in the body, said extension encased within said corresponding recess in said body restraining relative planar movement between the body and each extension about a direction along said insert axis;
each extension comprising a neck adjacent the radially outer surface and a retaining portion spaced radially outward from the neck, each neck extending through a throat region of one corresponding recess and having a neck cross-sectional area measured orthogonal to the radial direction, the throat having a throat cross-sectional area measured orthogonal to the radial direction and the retaining portion having a retaining cross-sectional area measured orthogonal to the radial direction, the retaining cross-sectional area being greater than the neck portion cross-sectional area and the throat cross-sectional area such that radial extraction of each extension from the one corresponding recess is prevented; and
a second ring comprised of at least one extension, said second ring disposed proximate said first ring.

* * * * *

UNITED STATES PATENT AND TRADEMARK OFFICE
CERTIFICATE OF CORRECTION

PATENT NO.        : 9,725,133 B2
APPLICATION NO.   : 14/341300
DATED             : August 8, 2017
INVENTOR(S)       : Jonathan Staples et al.

Page 1 of 1

It is certified that error appears in the above-identified patent and that said Letters Patent is hereby corrected as shown below:

On the Title Page

Page 2, item [56] Column 2, Line 22:
Delete: "FR 2501615 9/1982"
Insert: --FR 2501615 3/1982--

Signed and Sealed this
Tenth Day of October, 2017

Joseph Matal
*Performing the Functions and Duties of the
Under Secretary of Commerce for Intellectual Property and
Director of the United States Patent and Trademark Office*